United States Patent [19]
Jennings et al.

[11] 3,857,283
[45] Dec. 31, 1974

[54] DEPTHOMETER

[75] Inventors: Kirk E. Jennings, Kaneohi; Ronald L. Seiple, Kailua, both of Hawaii

[73] Assignee: The United States of America as represented by the Secretary of the Navy, Washington, D.C.

[22] Filed: Dec. 12, 1973

[21] Appl. No.: 424,149

[52] U.S. Cl. ........... 73/300, 73/88.5 SD, 73/398 AR
[51] Int. Cl. ............................................. G01f 23/18
[58] Field of Search.......... 73/300, 299, 291, 290 R, 73/398 AR, 88.5 SD; 58/152 R, 50 R; 350/160 LC; 338/42, 36

[56] References Cited
UNITED STATES PATENTS

| | | | |
|---|---|---|---|
| 2,986,038 | 5/1961 | Cerny | 73/300 X |
| 3,188,864 | 6/1965 | Dean | 73/300 |
| 3,203,244 | 8/1965 | Alinari | 73/300 |
| 3,651,693 | 3/1972 | Alinari | 73/300 |

FOREIGN PATENTS OR APPLICATIONS

| | | | |
|---|---|---|---|
| 1,523,923 | 10/1969 | Germany | 58/152 R |

*Primary Examiner*—Richard C. Queisser
*Assistant Examiner*—Joseph W. Roskos

[57] ABSTRACT

A wrist-carried depthometer senses the depth at which the wearer is located by sensing the water pressure acting on the back of the instrument employing a solid state strain transducer. A circuit is included to provide a digital readout of the depth in the desired units.

13 Claims, 4 Drawing Figures

DEPTHOMETER

STATEMENT OF GOVERNMENT INTEREST

The invention described herein may be manufactured and used by or for the Government of the United States of America for governmental purposes without the payment of any royalties thereon or therefor.

Field of the Invention

This invention pertains to the field of electrophysical instrumentation. More particularly, this invention pertains to the measurement of fluid pressures. In still greater particularity, this invention pertains to a fluid pressure measurement system which is calibrated in a depth of sea water corresponding to the sensed presure. By way of further characterization, but without limitation thereto, this invention pertains to a bodily worn depth gauge to be carried by a diver which will indicate the operational depth of the diver.

DESCRIPTION OF THE PRIOR ART

The majority of diver worn depth gauges are of the mechanical type. As an example, the pressure gauge taught by U.S. Pat. No. 2,986,038 to R. J. Cerny for "Wrist Pressure Gauge" issued on May 30, 1961, may be considered representative of this class. Such devices usually have a limited operational range and are subject to mechanical damage and require external light sources in order to be read at great depths, where the light is limited, or at night.

Certain other prior art instruments utilize optical-mechanical transducers to indicate depth or fluid pressure. In general, these systems employ a pressure deformed optical element which cooperates with additional optical elements caried by the device to provide an indication of fluid pressure. An example of this type of instrument is disclosed in U.S. Pat. No. 3,503,116 to R. R. Strack for "Method of Fabrication of a Pressure Transducer" and in U.S. Pat. No. 3,188,864 to D. J. Dean for "Water Depth Gauges." In general, although these gauges utilize fewer moving parts and have a theoretical increased reliability as a result, they are still subject to mechanical damage and require external light sources in order to provide indications to the diver of his operating depth.

Of course, electronic pressure gauges are known in the instrumentation arts. However, such devices, in the past, have been mainly intended for laboratory and fixed installation applications and are too fragile, too costly, and too expensive for practical applications.

The foregoing is not intended as an exhaustive analysis of the prior art, but merely an indication of principal types of prior art intruments having recognizable similarities in construction and purpose to this invention. The design of diving gear remains a somewhat empirical art and a great many ostensibly promising constructions have been proposed, tried, and quickly abandoned. Most require complex combinations of electrical and mechanical components which fail to achieve accuracy and reliability to match their technical innovation.

SUMMARY OF THE INVENTION

The present invention overcomes many of the disadvantages of the prior art by utilizing a personally carried instrument case which has an electronic strain transducer attached to a deformable portion of the case of the instrument. The sensed deformation of the case is translated, via suitble circuitry, to an electronic signal, the frequency of which is proportional to the detected case deformation. A suitable clocking circuit samples the eletronic signal over predetermined intervals and the number of oscillations occurring during that interval are displayed on a digital readout employing light emitting diodes. In this fashion the display indicates the depth in suitable units, and may be viewed by the diver even in darkened waters with a minimum chance of misinterpretation.

STATEMENT OF THE OBJECTS OF THE INVENTION

It is accordingly an object of this invention to provide an improved fluid pressure transducer.

A further object of this invention is to provide a fluid pressure instrument which may be calibrated in units corresponding to water depth.

Another object of this invention is the provision of a depthometer for use in underwater environments.

Still another object of this invention is to provide a depthometer which may be easily read in darkened waters.

A still further object of this invention is to provide a lightweight, reliable, diving instrument which may be carried by swimmers and divers.

Still another object of the present invention is to provide an improved electronic depthometer. Yet another object of this invention is to provide a diver-carried depthometer having an illuminated digital readout.

These and other objects of the invention will become more readily apparent from the ensuing specification when taken with the drawings.

DESCRIPTION OF THE PREFERRED EMBODIMENTS

Figure 1:
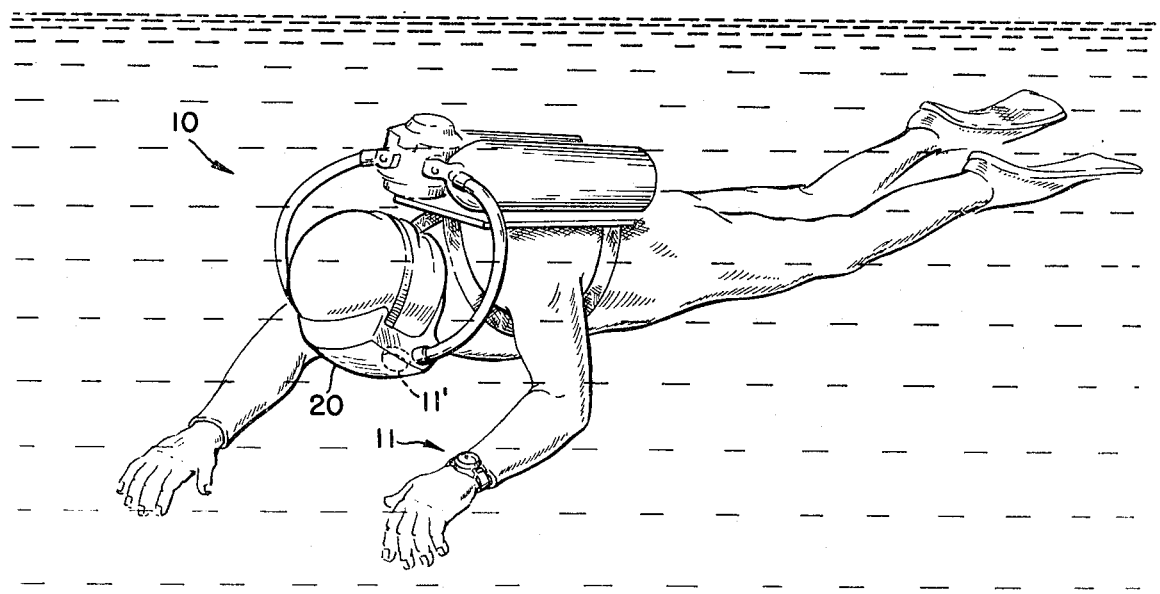
FIG. 1 is a perspective view showing the invention being worn by a diver.

Referring to FIG. 1, a diver, indicated generally at 10, is shown wearing the depthometer 11 on his wrist. If desired, depthometer 11 may be located at a position in front of the eye of diver 10 by mounting the device within the face mask 20. Such an alternate location is illustrated at 11'. Of course, when this alternate location is used, the depthometer 11' may be formed integrally with the mask 20.

Figure 2:
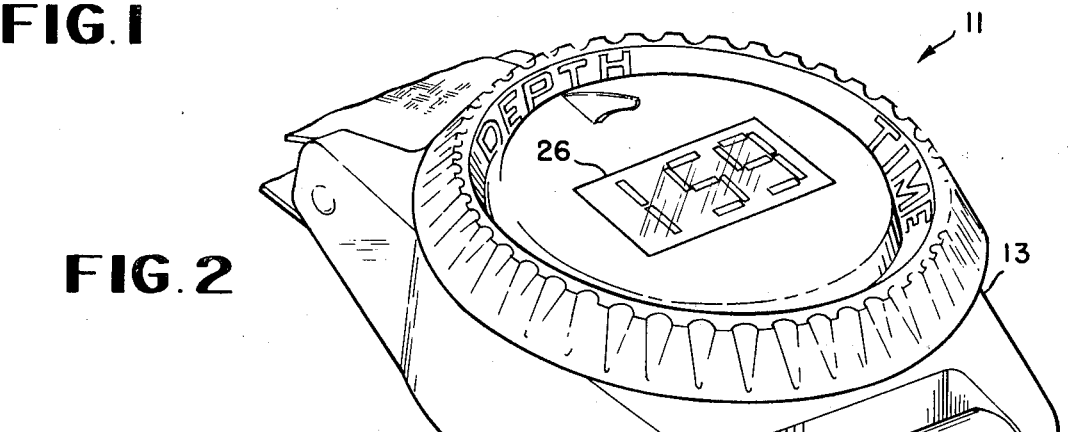
FIG. 2 is a perspective view of the face of the diving depthometer illustrated in FIG. 1.

Referring to FIG. 2, an enlarged view of depthometer 11 is shown. As illustrated, a strap 12, which encircles the wrist of diver 10, is attached to case 13 to provide body mounting of the depthometer 11. As may be readily seen, case 13 resembles the case construction commonly employed by jewelry manufacturers in the construction of wrist watches. Further, the circuit components comprising the depthometer 11 are mounted within case 13 by conventional wrist fabrication techniques. However, rather than have movable hand indicators, depthometer 11 employs a light emitting diode digital readout 26 which displays three significant figures.

Figure 3:
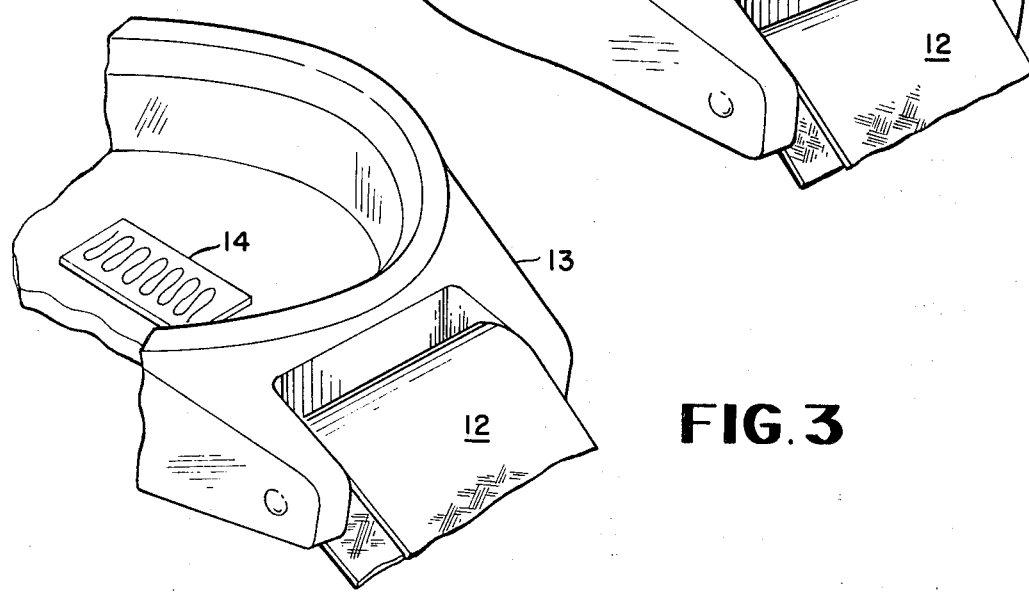
FIG. 3 is a breakaway view showing the mounting of pressure transducer on the case of the instrument shown in FIG. 2.

Referring to FIG. 3, certain constructional details of case 13 are illustrated. As shown, case 13 includes relatively thick marginal wall portions and strap attachment portions for receiving band 12 and a relatively thinner back portion upon which a strain transducer 14 is mounted. Of course, the ambient water pressure surrounding diver 10 presses on the thin bottom portion of case 13 and causes pressure deformation thereof. This pressure deformation is sensed by the strain transducer 14. Strain transducer may be of any state-of-the-art type either resistive or semiconductor type. In the instant invention the depth range of interest was zero to two hundred feet of sea water and, because of acceptable gauge factor ranges of semiconductor transducers for this operative range of interest, a semiconductor type ws chosen in developmental models.

Because the device of the invention may be used in waters of widely varying temperatures, some temperature compensation may be desirable. This, too, is an area of advantage for the semiconductor type transducer. That is, as is well understood in the electronic circuitry arts, such a transducer may be easily temperature compensated by appropriate circuit connections with a temperature transducer such as a thermister. Such a transducer may be conveniently mounted on the wall portions of the depression in cse 13 where it will be unaffected by pressure deformation of the bottom and is still exposed to the water temperature influenced environment of case 13. Such a connection and mounting of temperature compensation means is believed to be well within the skill of electronic instrumentation artisans and, accordingly, is not described in detail herein.

Figure 4:
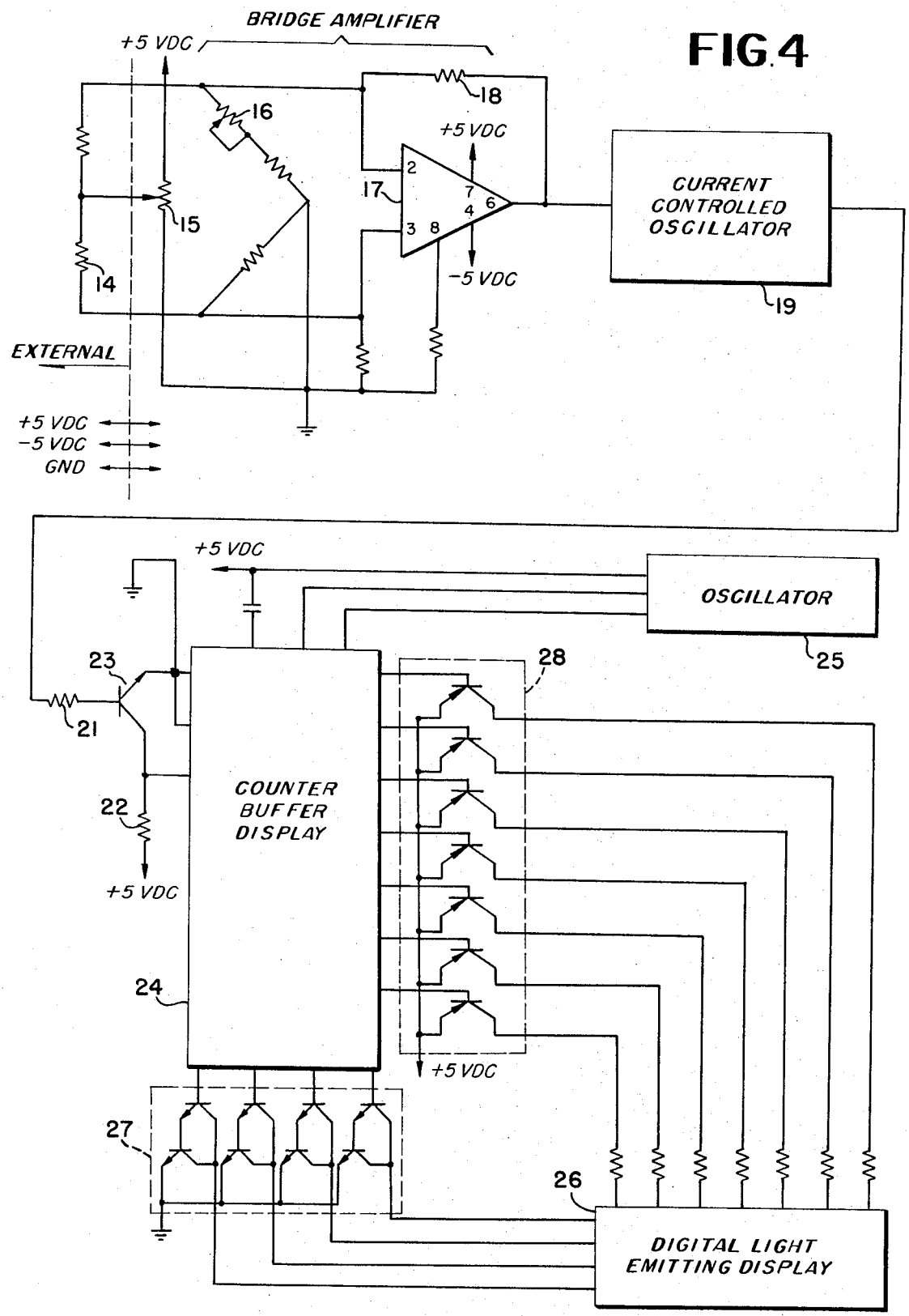
FIG. 4 is a diagrammatic view of the circuitry comprising the electronic portions of the depthometer of the invention.

Referring to FIG. 4, the circuit components to implement the circuitry of the invention are shown. As illustrated, pressure transducer 14 and a +5 volt D.C. and a −5 volt D.C. power supply are located externally from the pressure sealed package enclosing the remainder of the circuitry. This external location permits connection of the depth gauge 11 to a suitable power supply or, alternatively, to bateries which may be carried within case 13 as is conventional in personal electronic devices.

Sensor 14 is connected in a bridge circuit arrangement. Because minor flaws in case construction and mounting techniues can produce relatively large changes in the transistor resistance, a variable resistance 16 is included as an element in the bridge circuit and is used to balance the bridge arrangement after transducer 14 is installed on a particular case. Similarly, the voltage applied to the bridge is adjustable over a limited range by means of potentiometer illustrated at 15.

Because of the high gauge factor of the semiconductor transducer 14, a low gain, low drift transducer amplifier 17 may be used to sense the change of resistance of transducer 14. A resistance feedback circuit illustrated by resistor 18 is connected across amplifier 17 toimprove the linearity thereof. A number of solid state devices may be used for amplifier 17, however, for purposes of completeness, it should be noted that the type designated as 776 was selected on the basis of this overall performance in development of models. However, other devices such as the LM308 would be utilizable with appropriate circuit modifications. Of course, the selection of the particular amplifier used will also be determined by such parameters as the temperature range in which the depthometer is expected to be operated as well as circuit compatibility with the remainder of the circuit.

The output of amplifier 17 is connected to a current controlled oscillator 19. The current controlled oscillator may be of any standard design and in developmental models the oscillator used was a standard circuit employing two programmable operational amplifiers which may be easily encapsulated to withstand the pressures applied thereto. The particular circuit will depend upon the operational depths to which the device is to be used and the units for which the instrument is to be calibrated. In the developmental model, the calibration unit was chosen to be feet to correspond with know diving tables. The resulting circuit was satisfactory to depths of 10,000 feet. Quite naturally, linearity over this range is a desirable parameter and other circuit considerations and choices are made accordingly.

The output of current controlled oscillator 19 is coupled to a counter buffer display by a resistance network and a solid state impedance matchng device illustrated at 21, 22 and 23, respectively. Counter buffer display 24 also receives an input from a clocking oscillator 25. The frequency of the clocking oscillator is chosen in connection with the operational range of current controlled oscillator 19 to produce a significant three digit count to read in the desirable units, in this instance, feet.

The timing oscillator, like current controlled oscillator 19, is of a conventional design and is chosen for temperature and pressure stability over the anticipated range of values. In a developmental model a resistance-capacitance coupled oscillator using two MOS inverters has proven very stable and satisfactory. These circuits are well understood and may be designed to correspond with any desired unit of measurement such as meters, fathoms, or feet. An additional advantage of using the MOS circuits has a very low power requirement of these devices. That is, they draw power only when changing conductions state, hence the low frequency required demands a very low power from the modest size power sources normally carried within the case 13.

The counter buffer unit is also a conventional, available state-of-the-art circuit utilizing C-MOS individual units. This unit multiplexes and controls the digital display in the well understood conventionl manner. In order to conserve battery power only one digit is on at any given time, although the scan rate chosen is such that this alternate illumination of the various digits is not apparent to the eye. The output of the counter buffer display is connected to the actual digital display by suitable semiconductor networks illustrated at 27 and 28 as is well understood in the instrumentation arts. Similarly, digital light emitting display 26 is a commercially available state-of-the-art package comprising three digits out of seven segment arrangements of light emitting diodes. However, if desired, other low power state-of-the-art displays may be utilized.

The operation of the deice is completely automatic and the diver 10 need only insert fresh batteries at the beginning of a prolonged dive to assure himself of satisfactory depth instrumentatioon throughout the normal extent of the dive provided by carried underwater breathing apparatus.

Obviously, many modifications and variations of the present invention are possible in the light of the above teachings, and, it is therefore understood that within the scope of the disclosed inventive concept, the invention may be practiced otherwise than specifically described.

What is claimed is:

1. A diver-worn depthometer comprising:
 a case configured to have a sealable compartment therein having one wall which is shaped to be flexed by a predetermined external water pressure;
 attaching means connected to said case for securing said case to the person of a user;
 an electromechanical strain transducer attached to said one all so as to provide an electrical analog signal of the pressure-caused flexure of said one wall;
 circuit means positioned within the sealable compartment of said case and electrically connected to said electromechanical transducer for converting the electrical analog signal to an electrical, readout signal representative of the depth of water necessary to produce the measured flexure; and
 electrooptical means electrically connected to said circuit means for converting the electrical, readout signal to a visual signal, whereby the diver wearing the depthometer may determine his operating depth.

2. A depthometer according to claim 1 wherein said electrooptical means includes a digital display of the significant units of depth corresponding the the predetermined, external, water presure.

3. A depthometer according to claim 2 said digital display includes an arrangement of light-emitting diodes.

4. A depthometer according to claim 1 in which said electromechanical strain gage is a semiconductor type.

5. A depthometer according to claim 1 in which said circuit means includes:
 a resistance bridge circuit electrically connected to said electromechanical transducer;
 a current controlled oscillator effectively connected to said bridge circuit to produce a predetermined frequency output corrsponding to the output of said electromechanical transducer when operating over the normal range of pressures associated with the depths to be encountered by the diver;
 a counter circuit electrically connected to said current controlled oscillator to count and store the number of pulses within a predetermined count interval and connected to said electrooptical means for energization thereof; and
 clock means electrically connected to said counter circuit for supplying enabling and reset pulses to establish said predetermined count interval.

6. A depthometer according to claim 1 in which said attaching means includes a wrist strap.

7. A depthometer according to claim 1 in which said attaching means is a diving mask.

8. A depthometer according to claim 1 in which said circuit means and electrooptical means are carried in an assembly which closes the sealable compartment in said case means.

9. A depthometer according to claim 3 in which said electromechanical strain gage is a semiconductor type.

10. A depthometer according to claim 9 in which said circuit means includes:
 a resistance bridge circuit electrically connected to said electromechanical transducer;
 a current controlled oscillator effectively connected to said bridge circuit to produce a predetermined frequency output corresonding to the output of said electromechanical transducler when operating over the normal range of pressures associated with the depths expected to be encountered by the diver;
 a counter circuit electrically connected to said current controlled oscillator to count and store the number of pulses within a predetermined count interval and connected to said light-emitting diode digital display for energization thereof; and
 clock means electrically connected to said counter circuit for supplying enabling and reset pulses to establish said predetermined count interval.

11. A depthometer according to claim 10 in which said attaching means includes a wrist strap.

12. A depthometer according to claim 11 in which said attaching means is a diving mask.

13. A depthometer according to claim 12 in which said circuit means and electrooptical means are carried in an asembly which closes the sealable compartment in said case means.

* * * * *